United States Patent
Alster

(10) Patent No.: US 6,460,260 B1
(45) Date of Patent: *Oct. 8, 2002

(54) MOBILE CRUISER MACHINE FOR FORESTRY APPLICATIONS

(75) Inventor: L. Gregory Alster, Morton, IL (US)

(73) Assignee: Caterpilar Inc., Peoria, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/502,341

(22) Filed: Feb. 10, 2000

(51) Int. Cl.[7] ................................................ G01C 15/14
(52) U.S. Cl. ...................... 33/227; 33/264; 33/DIG. 21; 33/555.1
(58) Field of Search .......................... 33/262, 263, 264, 33/281–285, 391, 397, 227, DIG. 21, 228, 286, 291, 276, 277, 555.1; 280/762; 701/208, 213, 216, 225, 50

(56) References Cited

U.S. PATENT DOCUMENTS

| | | | | |
|---|---|---|---|---|
| 4,152,942 A | * | 5/1979 | Anderson et al. ............... 74/5 R |
| 4,267,737 A | * | 5/1981 | O'Connor et al. ............ 74/5.47 |
| 4,396,942 A | * | 8/1983 | Gates ........................... 348/135 |
| 4,497,117 A | | 2/1985 | Wrobley et al. ............... 33/276 |
| 4,593,474 A | * | 6/1986 | Mayhew ....................... 33/264 |
| 4,800,501 A | * | 1/1989 | Kinsky ........................ 701/220 |
| 4,820,041 A | * | 4/1989 | Davidson et al. .......... 356/3.12 |
| 4,837,717 A | * | 6/1989 | Wiklund et al. ............ 702/157 |
| 4,948,246 A | * | 8/1990 | Shigematsu ................ 356/5.08 |
| 5,125,467 A | * | 6/1992 | Mancheron ................ 180/6.48 |
| 5,249,157 A | * | 9/1993 | Taylor ......................... 340/903 |
| 5,517,419 A | * | 5/1996 | Lanchkton et al. ......... 701/216 |
| 5,844,679 A | * | 12/1998 | Detweiler et al. .......... 356/248 |
| 5,852,493 A | * | 12/1998 | Monnin .................... 356/141.1 |
| 5,963,733 A | | 10/1999 | Howard ......................... 703/6 |
| 5,970,433 A | * | 10/1999 | Oka et al. .................... 702/159 |
| 5,977,534 A | * | 11/1999 | Green et al. ............. 250/206.1 |
| 6,113,343 A | * | 5/2000 | Goldenberg et al. ........ 414/729 |
| 6,246,930 B1 | * | 6/2001 | Hort ............................. 701/23 |

* cited by examiner

Primary Examiner—Diego Gutierrez
Assistant Examiner—R. Alexander Smith
(74) Attorney, Agent, or Firm—Steve Lundquist

(57) ABSTRACT

A mobile machine for determining information at a forestry site. The mobile machine includes a gimbal base mounted on the mobile machine, a rotating laser beam range detector mounted on the gimbal base so that the rotating laser beam maintains a horizontal plane, a position determining system mounted on the mobile machine, and a slope determining system located on the mobile machine and electrically connected to a set of gimbals on the gimbal base, the gimbals being adapted to sense a slope of the mobile machine.

22 Claims, 5 Drawing Sheets

Fig_1_

MOBILE CRUISER MACHINE FOR FORESTRY APPLICATIONS

TECHNICAL FIELD

This invention relates generally to a mobile machine for applications at a forestry site and, more particularly, to a mobile cruiser machine for determining a set of parameters for a plurality of trees and terrain at the forestry site.

BACKGROUND ART

Before trees are harvested at a forestry site, it is typical to perform an operation known in the logging industry as cruising. Cruising involves scouting the forestry site to obtain information such as tree quantities, size, type, and condition, and other relevant data such as the condition of the terrain and ground throughout the site.

Historically, cruising is performed by hiring professional consultants to traverse the forestry site and gather the information by manual means. Recent developments in technology have aided the cruisers, such as the development of handheld global position satellite system (GPS) units to determine location coordinates of the trees, handheld computers to enter and store the data, and the like.

However, cruising remains an expensive, time-consuming, and inefficient method for gathering the needed data. In addition, typical cruising operations involves the cruisers traversing the forestry site by foot and stopping to take measurements, thus requiring much time and labor.

It is desired to provide a means to cruise a forestry site that is economical, efficient, and saves time and labor. In addition, it is desired to automate the information gathering processes of cruising to increase reliability and accuracy of the data gathered. Furthermore, it is desired to provide a mobile machine that is adapted to traverse the forestry site in an efficient manner, thus allowing an operator to gather information for forestry purposes with minimal time and labor.

The present invention is directed to overcoming one or more of the problems as set forth above.

DISCLOSURE OF THE INVENTION

In one aspect of the present invention a mobile machine for determining information at a forestry site is disclosed. The mobile machine comprises a gimbal base mounted on the mobile machine, a rotating laser beam range detector mounted on the gimbal base so that the rotating laser beam maintains a horizontal plane, a position determining system mounted on the mobile machine, and a slope determining system located on the mobile machine and electrically connected to a set of gimbals on the gimbal base, the gimbals being adapted to sense a slope of the mobile machine.

BEST MODE FOR CARRYING OUT THE INVENTION

Figure 1:
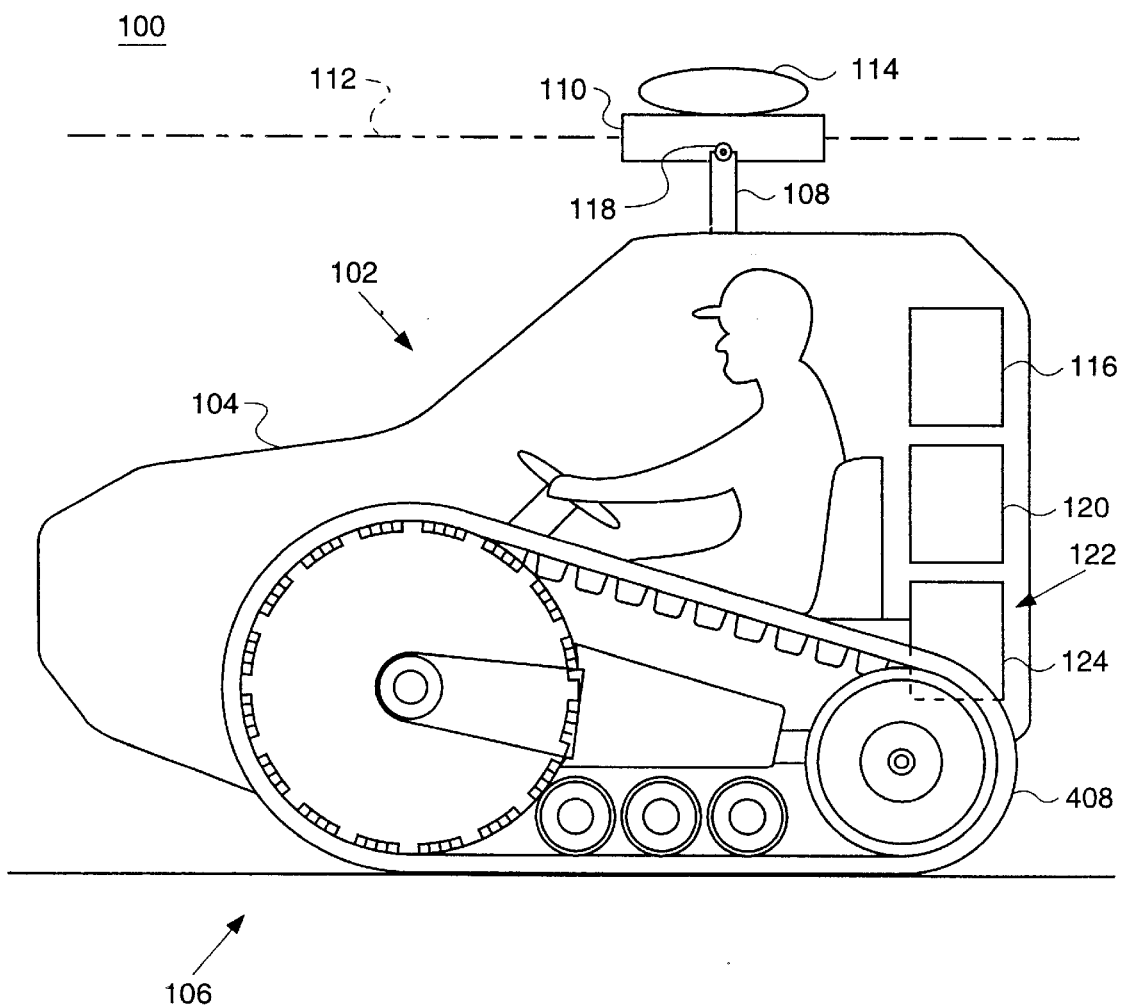
FIG. 1 is a diagrammatic illustration of a mobile cruiser machine suitable for use in the present invention.
Figure 2:
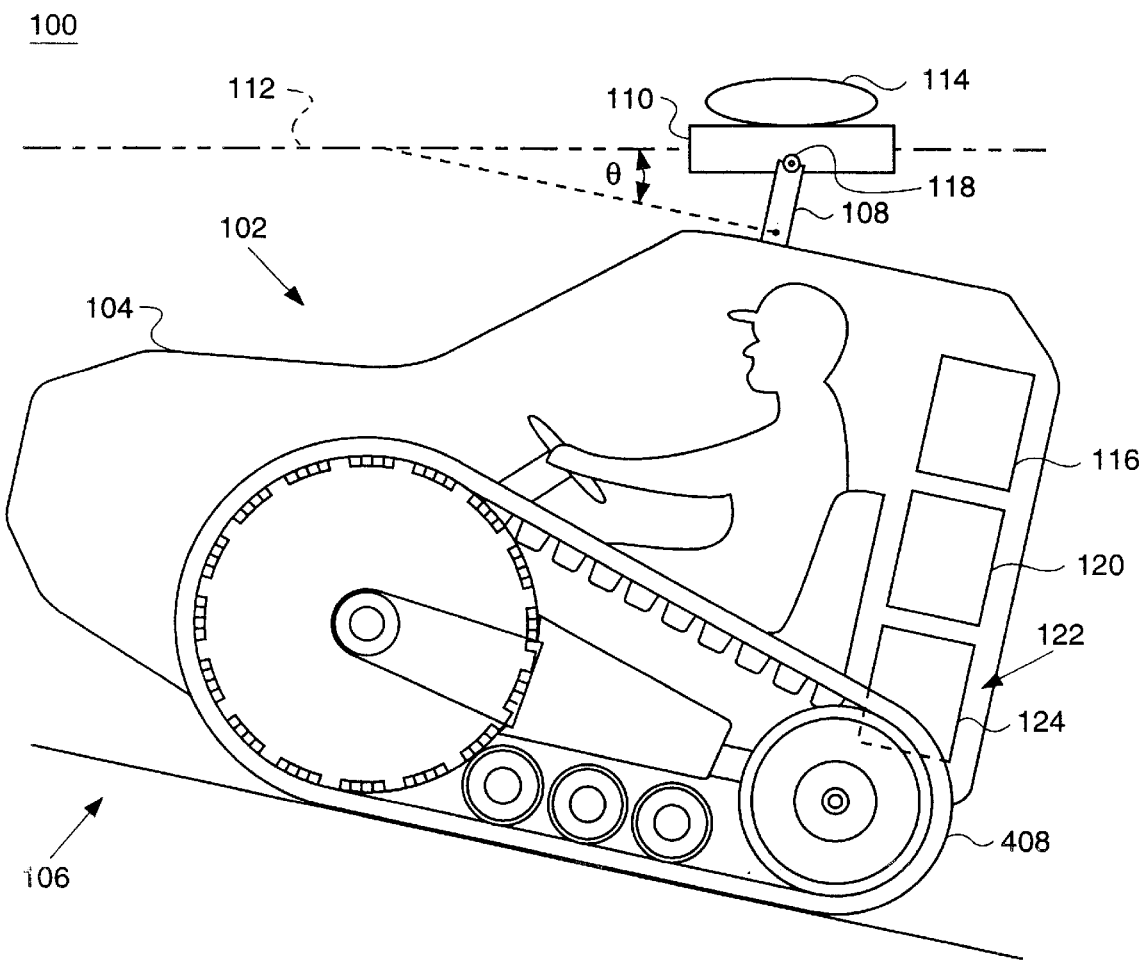
FIG. 2 is a diagrammatic illustration of the mobile cruiser machine of FIG. 1 on a sloped surface.

Referring to the drawings and the appended claims, an apparatus 100 is disclosed suitable for use in determining information at a forestry site 106 for harvesting of trees. With particular reference to FIGS. 1 and 2, the apparatus 100 is embodied as a mobile machine 102. More particularly, the mobile machine 102 is a mobile cruiser machine 104, adapted to traverse the forestry site 106 efficiently and reliably. Although the mobile cruiser machine 104 of FIGS. 1 and 2 is illustrated in a certain manner, it is understood that many variations in the design and construction of the mobile cruiser machine 104 may be employed without deviating from the spirit and scope of the present invention.

In the preferred embodiment, the mobile cruiser machine 104 has a narrow width and a low height, and is adapted for one operator. The low and narrow profile of the mobile cruiser machine 104 allows for traversal of a forestry site 106 which is too dense and rugged for traversal by other vehicles. The design of the mobile cruiser machine 104, as described below, allows for movement over rugged terrain.

Figure 4:
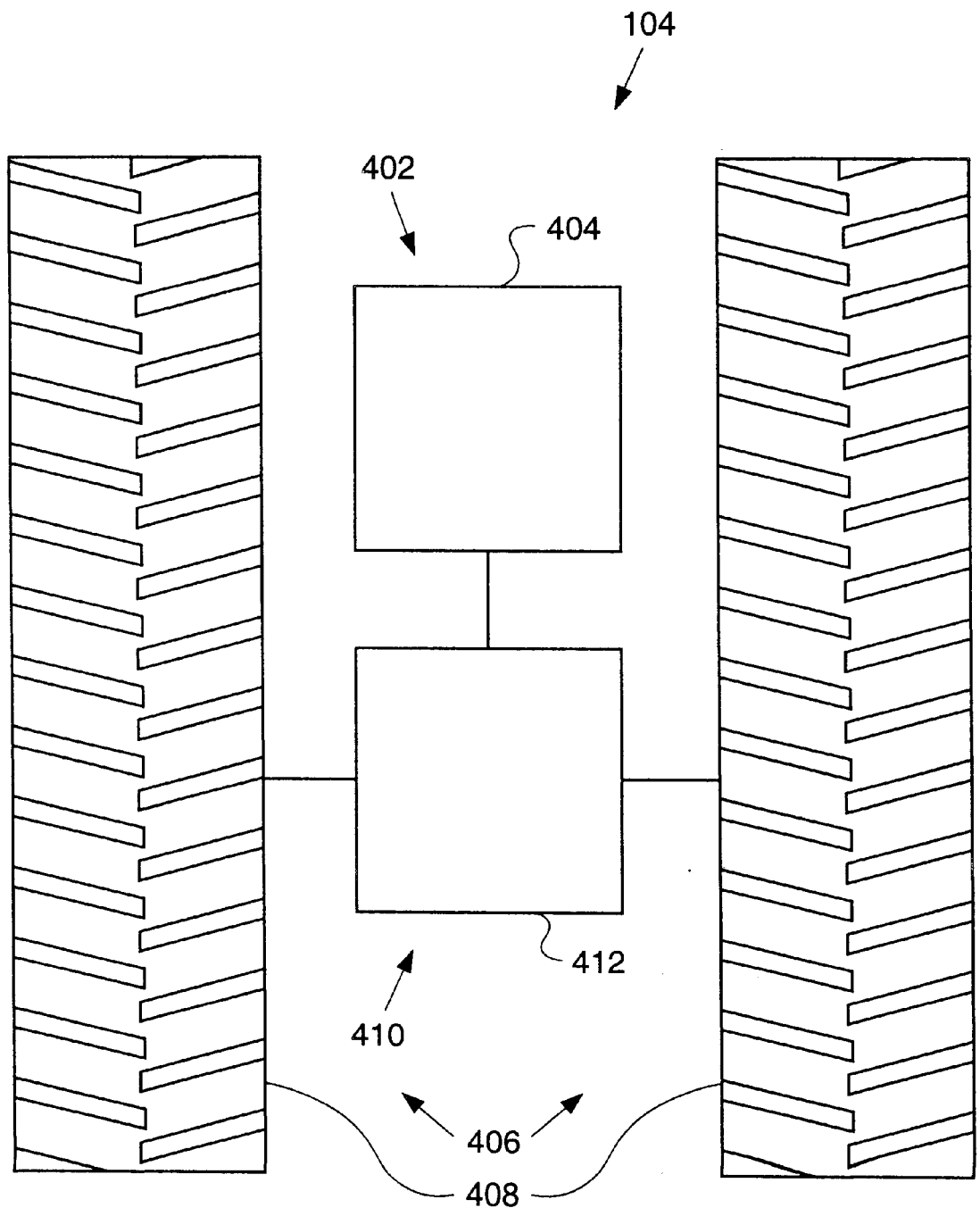
FIG. 4 is a diagrammatic illustration of a portion of a mobile cruiser machine which enables propulsion.

Referring to FIG. 4, the mobile cruiser machine 104 includes a primary power source 402, preferably an engine 404, a set of ground engaging members 406 drivably connected to the primary power source 402, and means 410 for steering the mobile cruiser machine 104.

In the preferred embodiment, and as illustrated in FIGS. 1 and 2, the set of ground engaging members 406 is a set of belted tracks 408. The set of belted tracks 408 offers the advantages of excellent traction and reduced impact on the terrain. However, the present invention would work with other types of ground engaging members 406, such as tires.

Preferably, the means 410 for steering the mobile cruiser machine 104 is a differential steering system 412, such as commonly used with tracked machines. A differential steering system 412 typically operates by controlling the rate of rotation of each belted track separately, thus steering the machine. Alternatively, the means 410 for steering may employ other types of steering typically used with mobile machines, such as clutch-brake, rack-and-pinion, and the like.

Referring back to FIGS. 1 and 2, a gimbal base 108, mounted on the mobile cruiser machine 104, includes a set of gimbals 118. The gimbals 118 are adapted to maintain a constant orientation with respect to a horizontal plane as the mobile cruiser machine 104 traverses the forestry site 106. In addition, the gimbals 118 are adapted to sense a slope of the mobile cruiser machine 104, the slope of the mobile cruiser machine 104 being determinative of the slope of the terrain at the forestry site 106. A set of slope value signals, generated by the gimbals 118, are delivered to a slope determining system 116 to determine the slope of the terrain as the mobile cruiser machine 104 traverses the forestry site 106 wherein traverses is defined as the mobile cruiser machine 104 in the state of movement.

Figure 3:
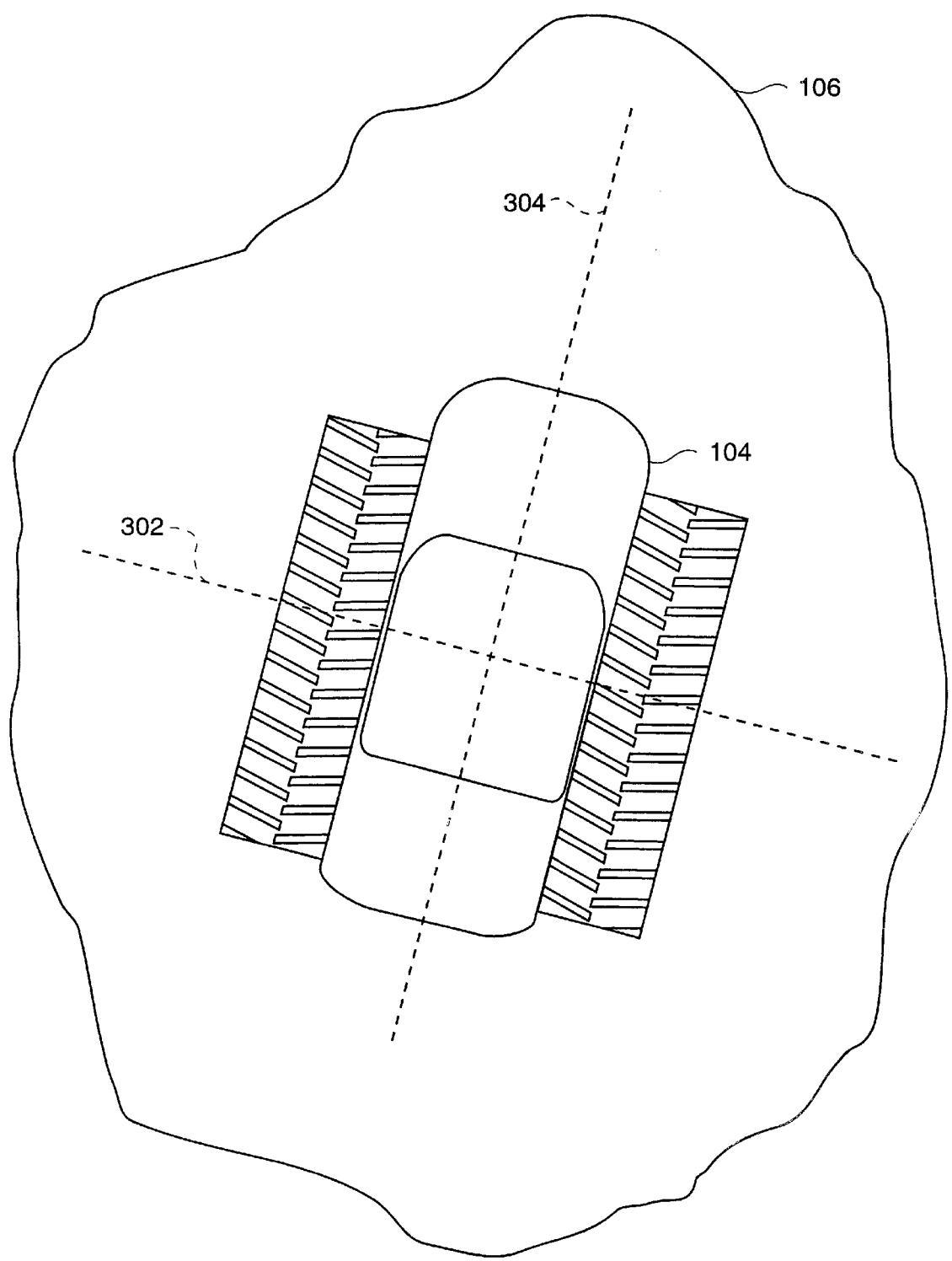
FIG. 3 is a diagrammatic illustration of a top view of a mobile cruiser machine depicting orthogonal, horizontal axes.

In the preferred embodiment, as depicted in FIG. 3, the gimbals 118 are arranged to sense a slope on two orthogonal, horizontal axes 302, 304. In this configuration, the gimbals 118 function as a two-axis inclinometer, thus providing a true indication of the slope of the terrain regardless of the heading and orientation of the mobile cruiser machine 104.

A rotating laser beam range detector 110 is mounted on the gimbal base 108 such that the rotating laser beam 112 maintains a horizontal plane. FIG. 1 depicts the mobile cruiser machine 104 on a level surface. However, FIG. 2 illustrates the mobile cruiser machine 104 on a sloped surface. The gimbal base 108 pivots to maintain the rotating laser beam range detector 110 at a horizontal position. Thus, the rotating laser beam 112 maintains a horizontal plane, although the mobile cruiser machine 104 is at a slope of θ degrees.

Figure 5:
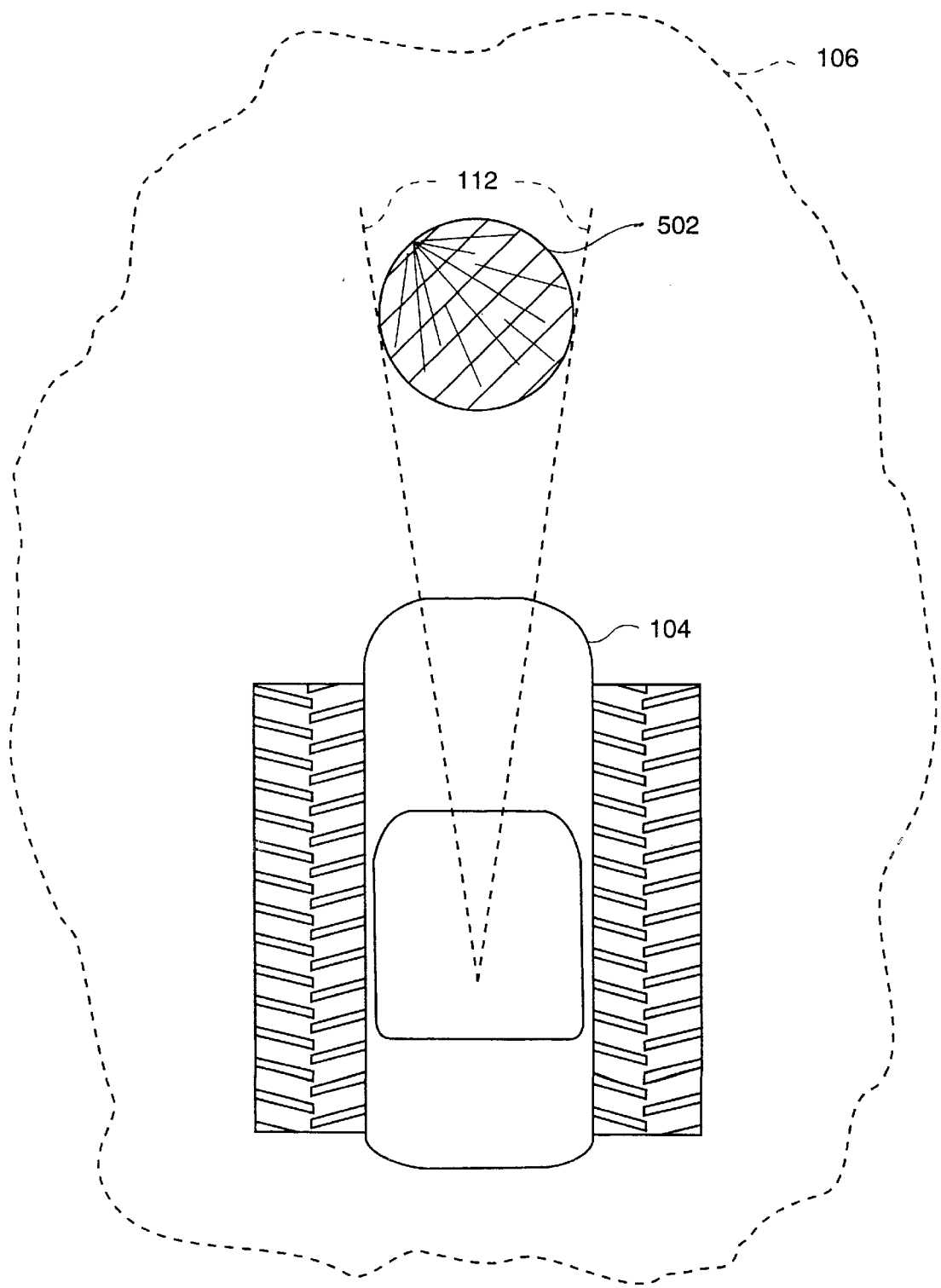
FIG. 5 is a diagrammatic illustration of a top view of a mobile cruiser machine scanning a tree with a rotating laser beam.

Referring to FIG. 5, the rotating laser beam range detector 110 is adapted to transmit a rotating laser beam 112 either in a complete circle or across an arc to scan a desired field. As FIG. 5 illustrates, the rotating laser beam 112 scans the width of the trunk of a tree 502. The rotating laser beam range detector 110 is adapted to determine the range from the mobile cruiser machine 104 to the tree 502. In addition, the rotating laser beam range detector 110 is adapted to determine the diameter of the trunk of the tree 502 at the height being scanned, using well known calculations based on the range and the scan angle. The diameter of the trunk of the tree 502 is indicative of the size of the tree 502.

A position determining system 114, mounted on the mobile cruiser machine 104, is adapted to determine the position in geographical coordinates of the mobile cruiser machine 104 at the forestry site 106. Using this information and the information from the rotating laser beam range detector 110, the geographical coordinates of each tree of interest may be determined.

A data storage system 120, located on the mobile cruiser machine 104, is adapted to store the information gathered as the mobile cruiser machine 104 traverses the forestry site 106. Examples of information gathered include, but are not limited to, the slope of the terrain, the numbers, sizes, locations, species, and conditions of trees, and information regarding obstacles, water bodies, and other features at the forestry site 106 which may affect harvesting operations. Information may be gathered automatically by sensing equipment, as described in the above examples, or may be observed and input manually by the operator of the mobile cruiser machine 104. In the preferred embodiment, the information is gathered with respect to a terrain map embodied as software in the data storage system 120.

A means 122 for communicating, located on the mobile cruiser machine 104, is adapted to communicate the information stored in the data storage system 120 to a desired location, such as an office site (not shown). The means 122 for communicating may use any of a variety of technologies. For example, the means 122 for communicating may be a communications system 124, configured as a wireless communications link. Alternatively, the means 122 for communicating may be a data transfer medium, such as a CD, disk, or wired data link for direct transfer of the information.

INDUSTRIAL APPLICABILITY

As an application of the present invention, the mobile cruiser machine 104 is adapted to traverse the rugged and dense terrain of a forestry site 106, and to gather information for subsequent harvesting of trees. The mobile cruiser machine 104 preferably is small and narrow profiled, thus being large enough to house one operator. The mobile cruiser machine 104 includes equipment for gathering and storing the information, including some information manually determined by the operator. Examples of information gathering equipment include, but are not limited to, range, size, and position determining equipment, data storage equipment, and communications equipment. The operator is responsible for traversing the forestry site 106 efficiently and completely.

Other aspects, objects, and features of the present invention can be obtained from a study of the drawings, the disclosure, and the appended claims.

What is claimed is:

1. A system for determining information at a forestry site for harvesting of trees, comprising:
   a mobile machine;
   a gimbal base mounted on the mobile machine;
   a rotating laser beam range detector mounted on the gimbal base and generating a rotating laser beam;
   a position determining system mounted on the mobile machine; and
   a slope determining system located on the mobile machine and electrically connected to a set of gimbals on the gimbal base, the gimbals being adapted to sense a slope of the mobile machine;
   wherein the gimbals maintain the rotating laser beam on a horizontal plane as the mobile machine traverses the forestry site.

2. A system, as set forth in claim 1, wherein the gimbals are adapted to sense a slope on two orthogonal, horizontal axes.

3. A system, as set forth in claim 1, wherein the rotating laser beam range detector determines a diameter of a trunk of each desired tree, the diameter of the trunk being indicative of a size of the tree.

4. A system, as set forth in claim 1, wherein the position determining system determines the location of each desired tree in geographical coordinates.

5. A system, as set forth in claim 1, further including a data storage system for storing information determined at the forestry site.

6. A system, as set forth in claim 5, further including means for communicating the information to a desired location.

7. A system, as set forth in claim 6, wherein the means for communicating is a wireless communications link.

8. A system, as set forth in claim 6, wherein the means for communicating is a data transfer medium.

9. A system, as set forth in claim 1, wherein the mobile machine is a mobile cruiser machine adapted in size to include one human operator.

10. A system, as set forth in claim 9, wherein the mobile cruiser machine includes:
    a primary power source to provide power for propulsion and for operating the mobile machine;
    a set of ground engaging members drivably connected to the primary power source; and
    means for steering the mobile machine.

11. A system, as set forth in claim 10, wherein the primary power source is an engine.

12. A system, as set forth in claim 10, wherein the set of ground engaging members is a set of belted tracks.

13. A system, as set forth in claim 12, wherein the means for steering the mobile machine is a differential steering system connected to the set of belted tracks.

14. A system for gathering information at a forestry site for harvesting of trees, comprising:
    a mobile cruiser machine;
    a gimbal base mounted on the mobile cruiser machine;
    a rotating laser beam range detector mounted on the gimbal base and generating a rotating laser beam;
    a position determining system mounted on the mobile cruiser machine;
    a slope determining system located on the mobile cruiser machine and electrically connected to a set of gimbals on the gimbal base, the gimbals being adapted to sense a slope of the mobile cruiser machine, wherein the gimbals maintain the rotating laser beam on a horizontal plane as the mobile machine traverses the forestry site; and a data storage system located on the mobile cruiser machine for storing information gathered at the forestry site.

15. A system, as set forth in claim 14, wherein the gimbals are adapted to sense a slope of the terrain at the forestry site on two orthogonal, horizontal axes.

16. A system, as set forth in claim 14, further including a communications system adapted to communicate the information to a desired location.

17. A system, as set forth in claim 14, further including:

an engine to provide power for propulsion and for operating the mobile cruiser machine;

a set of ground engaging members drivably connected to the engine; and means for steering the mobile cruiser machine.

18. A system, as set forth in claim 17, wherein the set of ground engaging members is a set of belted tracks,.and wherein the means for steering is a differential steering system connected to the set of belted tracks.

19. A system for cruising a forestry site to gather information for harvesting of trees, comprising:

a mobile machine;

a primary power source;

a set of ground engaging members drivably connected to the primary power source and adapted for providing propulsion of the mobile machine;

a gimbal base mounted on the mobile machine, the gimbal base having a set of gimbals attached;

a rotating laser beam range detector mounted on the gimbal base and generating a rotating laser beam;

a position determining system located on the mobile machine;

a slope determining system located on the mobile machine and electrically connected to the set of gimbals, the gimbals being adapted to sense a slope of the mobile machine, wherein the gimbals maintain the rotating laser beam on a horizontal plane as the mobile machine traverses the forestry site; and means for communicating the information for harvesting of trees to a desired location.

20. A system, as set forth in claim 19, further including a data storage system for storing the information for harvesting of trees.

21. A system, as set forth in claim 19, wherein the primary power source is an engine, and wherein the set of ground engaging members is a set of rubber belted tracks.

22. A method for determining information at a forestry site by a mobile machine having a gimbal base mounted on the mobile machine, a rotating laser beam range detector mounted on the gimbal base and generating a rotating laser beam, a position determining system mounted on the mobile machine, and a slope determining system located on the mobile machine and electrically connected to a set of gimbals on the gimbal base, including the steps of:

maintaining the rotating laser beam on a horizontal plane as the mobile machine traverses the forestry site;

scanning a trunk of each desired tree by the rotating laser beam;

determining a diameter of the trunk of each of the desired trees as a function of scanning the trunk;

determining a location of the mobile machine in geographical coordinates by the position determining system; and determining a location of each of the desired trees in geographical coordinates as a function of the location of the mobile machine.

* * * * *